United States Patent [19]

Hull

[11] Patent Number: 4,580,006

[45] Date of Patent: Apr. 1, 1986

[54] METHOD AND APPARATUS FOR PROVIDING TWO DIMENSIONAL POSITIONING DATA SIGNALS

[76] Inventor: Daniel T. Hull, 121 Mystic St., Medford, Mass. 02155

[21] Appl. No.: 620,488

[22] Filed: Jun. 14, 1984

[51] Int. Cl.[4] .............................................. G08C 21/00
[52] U.S. Cl. ..................................... 178/18; 340/709; 74/471 XY
[58] Field of Search ........................... 178/18, 19, 20; 340/709; 74/471 XY, 471

[56] References Cited

U.S. PATENT DOCUMENTS

| | | | |
|---|---|---|---|
| 3,013,441 | 12/1961 | Alexander | 74/471 |
| 3,269,190 | 8/1966 | Laman | 74/471 |
| 3,304,434 | 2/1967 | Koster | 250/231 |
| 3,350,956 | 11/1967 | Monge | 340/709 X |
| 3,541,521 | 11/1970 | Koster | 340/172.5 |
| 3,835,464 | 9/1974 | Rider | 340/324 |

Primary Examiner—Stafford D. Schreyer
Attorney, Agent, or Firm—Lahive & Cockfield

[57] ABSTRACT

An apparatus and methods for providing two-dimensional positioning data signals for positioning an indicating element have an upper, hand-movable member having a center of rotational movement in close proximity to a palm carrying surface. A fixed base support provides a frictional supporting surface for the hand movable member so that any discontinuities of friction arising from the operation of the sensing elements described below are masked. Position sensing elements provide electrical signals corresponding to the position of the hand movable member. The position signals are processed to provide for a fixed mapping of hand movable element position to indicating element position when either the x or y axis position signals are changing at a rate greater than a preset threshold, and for a (low) fixed ratio incremental positioning otherwise.

10 Claims, 6 Drawing Figures

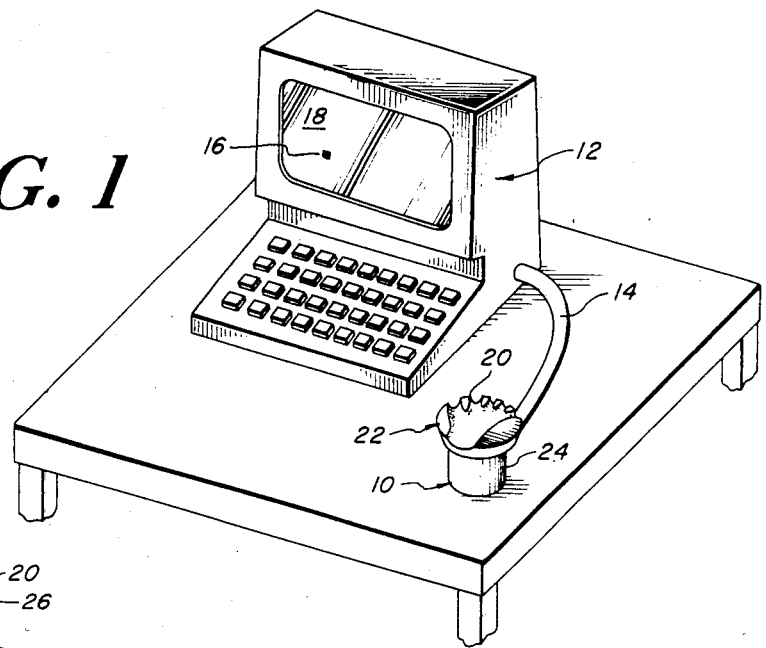
FIG. 1
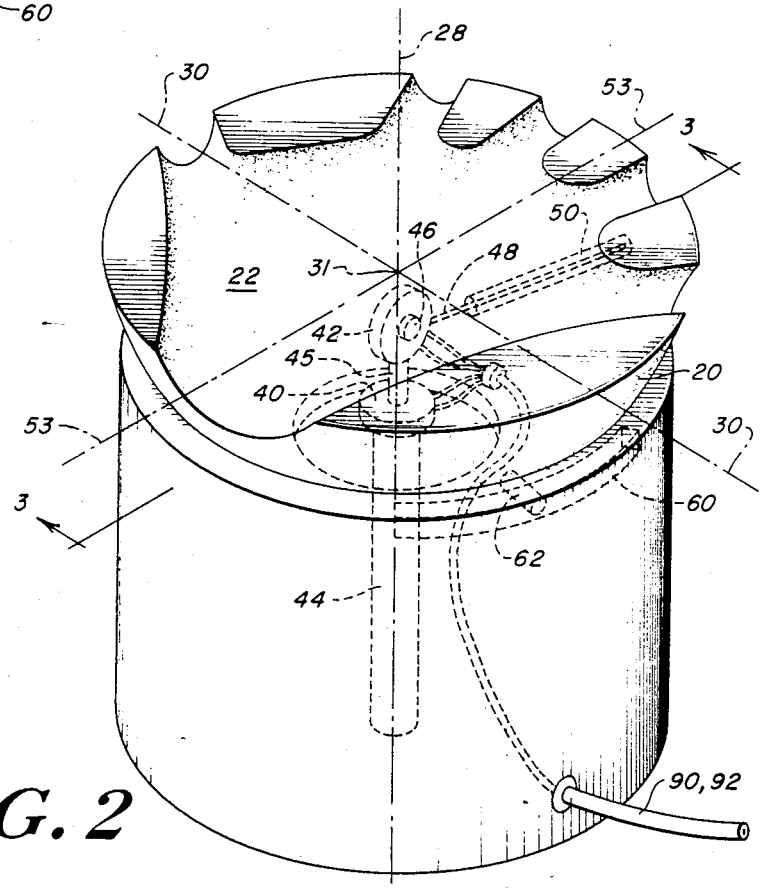
FIG. 2A
FIG. 2

METHOD AND APPARATUS FOR PROVIDING TWO DIMENSIONAL POSITIONING DATA SIGNALS

The invention relates generally to manual control apparatus and methods for a position control system, and in particular, to manual control apparatus and methods for positioning cursors or other indicators in word processing, video games, computer systems, and other machine and tool control applications.

BACKGROUND OF THE INVENTION

Manual controls, such as joysticks, are well known. Joysticks, for example both movable and isometric, provide positioning data for either incremental or variable rate positioning. Other manual controls include track balls, cursor control keys, data tablets, light pens, and "the mouse". While these control devices have been well used, each has problems such as hysteresis ("jumping" in the final approach to the target); nonhomogeneity of movement, especially noticeable near the limits of the control field; a requirement for excessive space such as that required by the "mouse"; and a dependence upon initial cursor position required by fixed rate and variable rate joysticks and the "mouse". The noted control elements also do not provide for consonance with the hand anatomy, that is, with the natural rotational movements associated with controlling the motions of an individual's wrist and arm motion.

Some workers in the field have attempted to solve the various positioning problems. For example, one worker adapts a multiple ratio control element which increments to a controlled position at a varying ratio to the increment in controller position depending upon the rate of movement of the manual control. This addresses the hysteresis problem but allows no "fixed mapping" of the control element position to the controlled position. Thus, this prior art method depends upon the initial starting position of the control element for incremental movement control.

It is therefore a primary object of the invention to provide a manual control apparatus and method adapted, substantially, to the natural movement of the hand to control movement of a position indicating element in two dimensions and which can be employed continuously without substantial fatigue. Other objects of the invention are a control apparatus which is simple and inexpensive to build and which is reliable and easy to operate. A further object of the invention is a position control apparatus and method wherein the indicated position of the control element translates, on a one-to-one basis, to the end position of a position indicating element.

SUMMARY OF THE INVENTION

The invention relates to an apparatus and method for providing two-dimensional position data signals. The apparatus features a hand movable member having a center of rotational movement therein and a palm carrying surface at an upper portion thereof. The palm carrying surface and the center of rotational movement are in close proximity and preferably are aligned with each other. The invention further features a base element for supporting the hand movable element and a position sensing apparatus for sensing the position of the hand movable member.

In this preferred aspect of the invention, there is further featured circuitry responsive to the sensing apparatus for developing therefrom positioning electrical signal data. The circuitry has elements for determining the rate of change of position along the two-dimensional positioning axes, and circuitry responsive to the rate of change for positioning a positioning indicating element substantially immediately at the sensed position when the rate of change along either axis is greater than a predetermined threshold. If both rates of change are less than the set threshold, the position indicating element is incremented at a fixed ratio to the rate of change of the controller along each axis. This allows a fine adjustment of position.

BRIEF DESCRIPTION OF THE DRAWINGS

Other objects, features, and advantages of the invention will appear from the following description taken together with the drawings in which:

FIG. 1 shows a typical application of the position control apparatus of the invention;

FIG. 2 is a perspective view of a typical control element according to the invention;

FIG. 2A is a sectional view of the control element guide members according to the invention;

DESCRIPTION OF A PREFERRED EMBODIMENT

Figure 3:
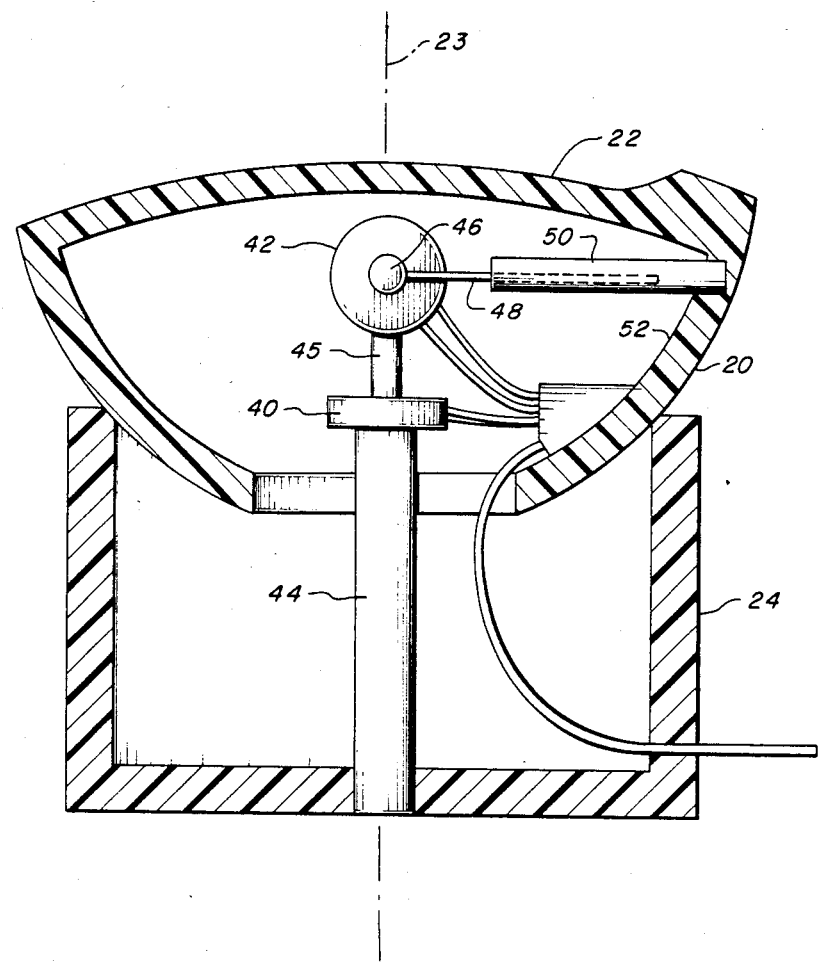
FIG. 3 is a cross-sectional view along lines 3—3 of FIG. 2.

Referring to FIG. 1, the invention relates to the use of a manually controlled element 10 to provide position control to an electrically driven apparatus such as for example a word processing console 12. The electrically driven apparatus responds to the signals from the manual control element 10 over lines 14 to locate a position indicator 16, such as for example a cursor, on its monitor screen 18.

The manual controller 10 generally has a hand movable portion 20 which, in the illustrated embodiment, has a palm supporting surface 22. An individual thus manually operates the controller 10 and the electrically driven apparatus 12 responds to movement of the hand movable portion 20 by moving the position indicator 16 in response thereto. Preferably, according to the invention, there is a one-to-one correspondence between the position of the hand movable portion 20 and the position of the indicator 16.

Referring now to FIG. 2, the manual controller 10 provides the hand movable element 20 with a base support member 24 on which the hand movable element 20 can slidably rotate. Atop the hand movable element 20, the palm supporting surface 22 provides a natural support for the hand and allows it to manipulate the hand movable element 20 in a manner which does not generate fatigue or weariness. The hand movable element has a generally hemispherical configuration which is supported by a beveled upper lip 26 of the bottom base support member 24.

The hand movable element is free to rotate on the base support about two rotation axes, one degree of rotation being about a substantially vertical axis 28 and the other degree of rotation being about an axis 30 normal to the vertical axis and a palm support surface centerline, and substantially at the palm support surface. The intersection of axes 28 and 30 define a center of rotational movement 31 of the upper control element 20 and that center of movement is desirably, as described below, in close proximity to the palm supporting surface 24. The lower base support member 24, in the illustrated embodiment, is a hollow cylindrical element having the beveled lip 26 supporting the upper hand moveable control element 20 for continuous frictional engagement therewith, thereby masking the potential discontinuous frictional characteristics of the position sensors which translate the rotational position of the movable element 20 into a physically measurable quantity.

The position sensors, in the illustrated embodiment, are linear electrical resistance potentiometers 40, 42. Potentiometer 40 has a shaft rotation axis parallel to and preferably coaxial with vertical rotation axis 28. A shaft member 44 of potentiometer 40 extends substantially the entire height of the base support member and supports potentiometer 40 mounted threon. Mounted on the potentiometer 40, through a shaft 45 in the illustrated embodiment, and having its shaft rotation axis substantially parallel to, and preferably coaxial with, axis 30, is the second potentiometer 42. Potentiometer 42 and potentiometer 40 thus rotate together about axis 28.

Potentiometer 42 has connected to its shaft 46 a control rod 48 passing into a hollow sleeve 50. Sleeve 50 flexibly connects to the interior of hemispherical shell 52 of manually movable element 20 at a point close to the intersection of diameter 53 with the shell surface. The control rod 48 is in sliding contact with the sleeve 50 and thus, any movement of the upper control element 20 about axes 28 or 30 translates into either rotation of the shaft 46 (potentiometer 42) and/or potentiometer 40.

Though it is clear that the device as so far described can easily be modified to pick up rotation around the palm centerline axis (side to side "tilting") as a third dimension of control, and that this would be useful for some applications, in practice many applications do not require it; indeed the operators find freedom of rotation in this dimension distracting. Accordingly, the control apparatus of FIG. 2 further has guide elements to substantially prevent rotation of the upper control element around the axis 53 normal to a plane defined by axes 28 and 30. The guide elements, in the illustrated embodiment, include tracks 60 contained in an upper portion of the wall of base element 24 and rod members 62 extending from hemispherical shell 52. There are two tracks, at opposing side wall positions of shell 52. The upper hemispherically shaped hand movable control element 20 correspondingly has two track following rod members 62, each fitting within a respective track 60. The combination of track 60 and rod member 62 substantially prevents rotational movement of the control element about rotation axis 53 normal to the plane defined by axes 28 and 30. In addition, the tracks are of limited lateral extent and hence limit the rotational movement of the manually movable control element 20 about axis 28.

The rotational freedom provided by the allowable movement of the upper, manually movable control element 20 corresponds to the natural and less tiring rotational movements of the hand. The structure thus prevents that kind of tiring hand motion which corresponds to a twisting or rotation of the hand about an axis parallel to the arm. As a result, the structure described herein enables substantially continuous operation and control by an individual without the fatigue inherent in other manual control systems. In addition, placement of the center of rotation of the upper manually movable control element 20 near the palm supporting surface provides more accurate and reliable control of the position indicating element, less fatigue, and better tactile feedback to the individual.

Figure 4:
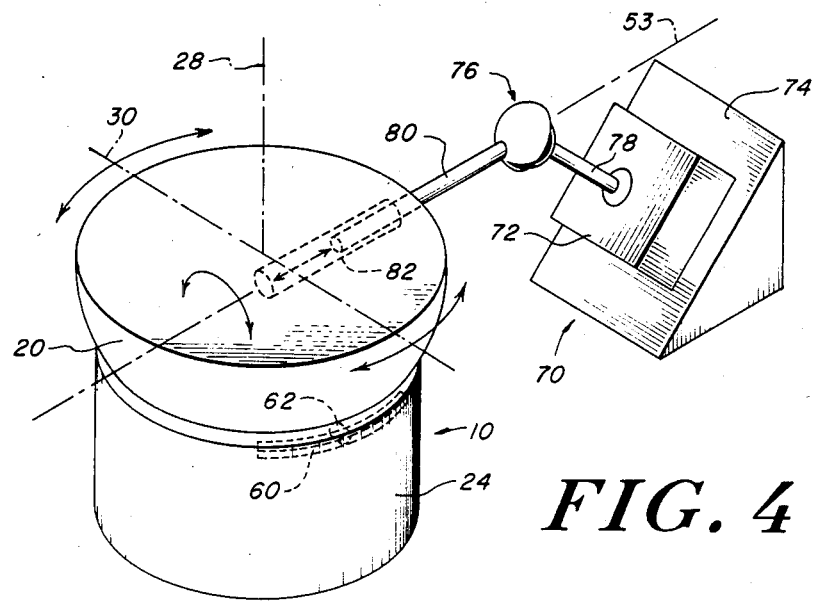
FIG. 4 is a perspective view of a second embodiment according to the invention.

In another embodiment of the invention, referring to FIG. 4, a position sensing element 70 is located external to the manual controller 10. In this embodiment, the sensing element 70 is a standard joystick resolving position sensing means 72, mounted external of the control means on a base 74. The joystick connects, through a universal joint 76, to the hand movable element 20. A shaft 78 of the joystick 72 is coupled to a control rod 80 at the universal joint 76. Control rod 80 slides in a sleeve 82, sleeve 82 having an axis which is coaxial with a diameter of the hemispherically shaped movable element 20 and the resulting structure resolves rotation about axis 28 and the pronation/supination movement about axis 30 while remaining relatively insensitive, in the illustrated embodiment, to "twisting", that is, rotation about axis 53 normal to a plane defined by axes 28 and 30. In accordance with the first embodiment of the invention, restraining guide elements 60 and 62 are employed herein.

Figure 5:
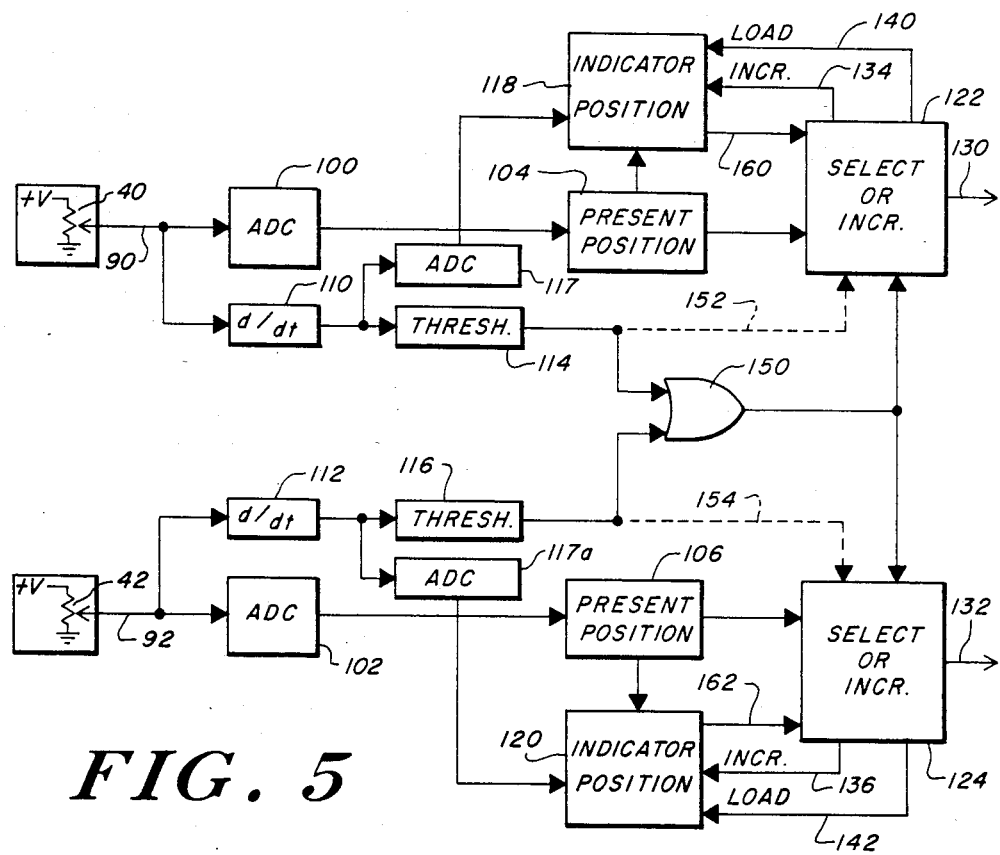
FIG. 5 is an electrical circuit block diagram showing processing of the signal information available from the position control structure.

Referring now to FIG. 5, according to the illustrated embodiment of the invention, the electrical outputs from the potentiometers 40 and 42 over lines 90, 92 are passed to A/D converters 100, 102 for sampling, and then to present-position registers 104, 106 respectively for storage. Simultaneously, differentiators 110, 112 differentiate the position signal outputs of the potentiometers and thresholding elements 114, 116 receive the outputs of differentiators 110, 112 respectively. The thresholding element provides a first output signal level when the magnitude of the differentiated output of the connected differentiator exceeds a preset threshold, and a second output signal level otherwise. Second A/D converters 117, 117a digitize the outputs of the differentiators 110, 112 respectively.

The present-position registers 104, 106 provide position data representing the position indicated by the manually movable element 20 to both an indicator position register 118, 120 and a select or increment control circuitry 122, 124, respectively.

The select or increment circuitry samples the input from an OR gate 150 and performs one of the following two actions in response thereto. When the output of a differentiator 110 or 112 exceeds the threshold level of the corresponding threshold element 114, 116, a fixed mapping of the present control element position to the position of element 16 is output over lines 130, 132, by the select or increment circuitry 122, 124. Circuitry 122, 124 thus passes the present control element position from registers 104, 106 through to its output lines 130, 132, and loads, by a signal over load lines 140, 142, the present control element position stored in registers 104, 106 into position registers 118, 120 respectively.

When the outputs of the threshold element for both axes indicate that the threshold level is not exceeded (the control element is being moved slowly), the select or increment control circuitry increments register 118, 120 at a fixed ratio of the incremental positional movement of the control element. The incremental change in the control position is available from the differentiators 110, 112, through A/D converters 117, 117a, and is converted to a digital value at a ratio less than one by converters 117, 117a. The present indicator position stored in register 118, 120 is then updated by adding a fraction (the fixed ratio) of that control position difference (calculated and available as noted above) to the present indicator position. This update process occurs in response to a signal pulse from the select or increment control circuitry over increment lines 134, 136. The new indicator position is available over lines 160, 162 and is passed through circuitries 122, 124 respectively to the external circuitry over the lines 130, 132.

As illustrated in FIG. 5, the two axes operate jointly, and hence both axes are either in the incremental movement mode of operation or in the fixed mapping mode of operation. Joint operation is effected by an OR gate 150. On the other hand, in other embodiments of the invention, the axes can be operated independently, as shown, by removing the OR gate 150 and adding the dashed connections 152, 154. Alternately, further processing can be performed on the outputs of thresholding elements 114, 116 or differentiators 110, 112 to implement any desired thresholding scheme.

Additions, subtractions, deletions, and other modifications of the disclosed preferred embodiments of the invention will be apparent to those skilled in the art and are within the scope of the following claims.

What is claimed is:

1. Apparatus for providing two-dimensional positioning data signals comprising
    a hand movable member having a center of rotational movement and a palm carrying surface, said center of movement being in close proximity to said palm carrying surface,
    a fixed base for supporting said hand movable member,
    position sensing means for sensing the position of said hand movable member,
    means responsive to said sensing means for developing positioning electrical signal data therefrom, said developing means comprising
    means for determining a rate of change of position for said palm carrying member, and
    means responsive to said rate of change for positioning a position indicating element by mapping said palm carrying member position to an indicating element position if the rate of change is greater than a predetermined threshold, and for providing a fixed rate incremental positioning of said indicating element if the rate of change is less than said threshold.

2. Apparatus for providing two-dimensional positioning data signals comprising
    a hand movable member having a center of rotational movement and a palm carrying surface, said center of movement being in close proximity to said palm carrying surface,
    a fixed base for supporting said hand movable member,
    position sensing means for sensing the position of said hand movable member,
    wherein said sensing means comprises
        a first rotation measuring element for measuring rotation about a vertical measurement axis, and
        a second rotation measuring element for measuring rotation about a measurement axis normal to said vertical axes and to a palm centerline axis of said palm surface, and wherein
    said first and second measuring elements each comprise a resistance potentiometer, one said potentiometer being mounted to and supported by said other potentiometer for rotational movement therewith, and
    said first and second measuring elements defining measuring axes normal to each other and intersecting substantially in close proximity to said palm carrying surface.

3. Apparatus for providing two-dimensional positioning data signals comprising
    a hand movable member having a center of rotational movement and a palm carrying surface, said center of movement being in close proximity to said palm carrying surface,
    a fixed base for supporting said hand movable member,
    position sensing means for sensing the position of said hand movable member, and
    movement guide means for limiting movement of said movable member relative to said base solely to rotational movement around a first and a second rotational axis.

4. The apparatus of claim 3 wherein said guide means comprises
    a track defining member fixed with respect to one of said movable member and said base,
    a track following member fixed with respect to the other of said movable member and said base, and
    said track defining member and track following member together adapted for preventing rotational movement of said movable member around an axis substantially parallel to a palm support surface centerline.

5. Apparatus for providing two-dimensional positioning data signals comprising
    a hand movable member having a center of rotational movement and a palm carrying surface, said center of movement being in close proximity to said palm carrying surface,
    a fixed base for supporting said hand movable member,
    position sensing means for sensing the position of said hand movable member, and wherein
    said fixed base has a frictional supporting surface for supporting said hand movable member,
    whereby frictional discontinuities introduced by the operation of the sensing means are masked by the frictional engagement between said movable member and said frictional surface.

6. The apparatus of claim 5 further wherein
    said hand movable member comprises a hemispherical member, and
    said fixed base comprises a hollow cylindrical supporting member having, at an upper end thereof, a beveled supporting lip adapted to receive said hemispherical member.

7. The apparatus of claim 5 wherein said sensing means comprises
    a first rotation measuring element for measuring rotation about a vertical measurement axis, and
    a second rotation measuring element for measuring rotation about a measurement axis normal to said vertical axis and to a palm centerline axis of said palm surface.

8. Apparatus for positioning a position indicator in response to positioning electrical signal data comprising means for determining a rate of change of position in accordance with the output of a first and a second position sensing element for a first and a second movement axis, and means responsive to said rate of change for positioning said position indicator by mapping said palm carrying member position to an indicating element position if the rate of change is greater than a predetermined threshold, and for providing a fixed rate incremental positioning of said indicating element if the rate of change is less than said threshold.

9. A method for providing two-dimensional positioning data signals comprising the steps of positioning, in close proximity, a palm carrying surface of a hand movable member and a center of movement of said hand movable member, supporting said hand movable member for movement about said center of rotation, sensing the position of the hand movable member, developing positioning electrical signals from the sensed position, determining the rate of change of position for said movable member, and positioning a position indicating element by mapping said palm carrying member position to an indicating element position if the rate of change is greater than a predetermined threshold, and for providing a fixed rate incremental positioning of said indicating element if the rate of change is less than said threshold.

10. A method for providing two-dimensional positioning data signals comprising the steps of positioning, in close proximity, a palm carrying surface of a hand movable member and a center of movement of said hand movable member, supporting said hand movable member for movement about said center of rotation, sensing the position of the hand movable member, and restraining rotational movement of said hand movable member to rotation about a vertical axis substantially normal to said palm carrying surface and an axis substantially normal to a plane defined by a palm center line of said palm carrying surface and said vertical axis.

* * * * *